(12) United States Patent
Kovarik et al.

(10) Patent No.: US 11,297,822 B2
(45) Date of Patent: *Apr. 12, 2022

(54) SYSTEM AND METHOD TO DRIVE AWAY GEESE

(71) Applicants: Joseph E. Kovarik, Englewood, CO (US); Jeff Franek, Highlands Ranch, CO (US)

(72) Inventors: Joseph E. Kovarik, Englewood, CO (US); Jeff Franek, Highlands Ranch, CO (US)

(*) Notice: Subject to any disclaimer, the term of this patent is extended or adjusted under 35 U.S.C. 154(b) by 161 days.

This patent is subject to a terminal disclaimer.

(21) Appl. No.: 16/733,599

(22) Filed: Jan. 3, 2020

(65) Prior Publication Data

US 2020/0187487 A1 Jun. 18, 2020

Related U.S. Application Data

(63) Continuation of application No. 15/374,382, filed on Dec. 9, 2016, now Pat. No. 10,524,465.

(60) Provisional application No. 62/266,069, filed on Dec. 11, 2015.

(51) Int. Cl.
| | | |
|---|---|---|
| *A01M 29/10* | (2011.01) | |
| *A01M 29/18* | (2011.01) | |
| *A01M 29/06* | (2011.01) | |
| *A01M 29/16* | (2011.01) | |

(52) U.S. Cl.
CPC ............ *A01M 29/10* (2013.01); *A01M 29/06* (2013.01); *A01M 29/16* (2013.01); *A01M 29/18* (2013.01)

(58) Field of Classification Search
CPC .................................................... A01M 29/10
See application file for complete search history.

(56) References Cited

U.S. PATENT DOCUMENTS

| | | |
|---|---|---|
| 5,040,726 A | 8/1991 | Dimitri |
| 5,193,808 A | 5/1993 | Takeshi |
| 6,176,047 B1 | 1/2001 | Morningstar |
| 6,179,218 B1 | 1/2001 | Gates |
| 6,487,811 B2 | 5/2002 | Horrell |
| 6,435,422 B1 | 8/2002 | Wutschik |
| 6,575,597 B1 | 6/2003 | Cramer |
| 6,760,993 B2 | 5/2004 | Lebens |
| 6,906,472 B2 | 6/2005 | Wong |
| 7,117,628 B1 | 10/2006 | Bailey |
| 7,411,504 B2 | 8/2008 | Hanscom |
| 7,506,815 B2 | 3/2009 | Speigel |
| 7,699,018 B2 | 4/2010 | Wells |
| 8,226,260 B2 | 7/2012 | Whalan |
| 8,485,856 B2 | 7/2013 | Paternostro |
| 8,667,930 B2 | 5/2014 | Homung |

(Continued)

*Primary Examiner* — Jessica B Wong
(74) *Attorney, Agent, or Firm* — Sheridan Ross P.C.

(57) ABSTRACT

A system and method for driving geese away from an area employs predetermined random illuminations of particular wavelength light directed in a fashion that repels geese while avoiding annoying humans. Embodiments include systems associated with golf course flags and other structures and animal decoys that hide undesired aesthetic appearances of prior art industrial lighting elements. Other embodiments employ adjustable/movable mirror elements used in conjunction with systems powered by solar energy panels positioned below the light source, which can be adjusted in terms of direction, shielding, color, duration, wavelength and pulsation, providing a variety of random patterns so as to avoid habituation by geese.

20 Claims, 6 Drawing Sheets

(56) References Cited

U.S. PATENT DOCUMENTS

| | | |
|---|---|---|
| 8,718,297 B1 | 5/2014 | Norris |
| 8,934,319 B2 | 1/2015 | Donoho |
| 9,055,737 B2 | 6/2015 | Matzel et al. |
| 9,078,425 B1 | 7/2015 | Heiges |
| 10,524,465 B2 | 1/2020 | Kovarik et al. |
| 2003/0058740 A1 | 3/2003 | Jincks |
| 2012/0113754 A1 | 5/2012 | Husseiny |
| 2013/0014423 A1 | 1/2013 | Tonkovich |
| 2014/0326195 A1 | 11/2014 | Gitrie |
| 2015/0035437 A1 | 2/2015 | Panopoulos |
| 2015/0230450 A1 | 8/2015 | Norris |
| 2016/0044910 A1 | 2/2016 | Lang |

SYSTEM AND METHOD TO DRIVE AWAY GEESE

RELATED APPLICATION

This application is a continuation of U.S. patent application Ser. No. 15/374,382, filed on Dec. 9, 2016 (now U.S. Pat. No. 10,524,465, issued Jan. 7, 2020), which claims priority from U.S. Provisional Patent Application Ser. No. 62/266,069 filed on Dec. 11, 2015. The entire disclosure of the prior application is considered to be part of the disclosure of the accompanying application and is hereby incorporated by reference.

FIELD OF THE INVENTION

A system and method for driving geese away from an area employs predetermined wavelength light directed in a fashion that repels geese while also avoiding undesired light annoyance of humans, such system connectable to golf course structures and/or housed in an animal decoy, and being operated in a manner that avoids habituation by geese via random emission of signals as to direction, shielding, color, duration, color and pulsation of signals.

BACKGROUND OF THE INVENTION

In recent years, due to changes in land use, climate changes, and cultural practices, populations of several avian species, including the Canadian Goose, has increased. Associated with this increase in population, is damage to property as well as increased risks to human health and safety. Although these problems are on the rise, the number of management options available to control birds has been limited to non-lethal approaches. There are two types of Canadian geese that cause problems for residents, golf courses, public parks, airports, etc.—resident geese and non-resident geese. Resident geese have a small territory that they habituate annually and they do not migrate to Canada. Non-resident geese migrate to Canada annually. Geese will usually, at night, rest on the water, away from land predators, and spend a majority of their night resting on the water where it is safe.

Unlike migratory geese, resident Canada geese (*Branta canadensis*) breed and nest in the United States. From 1970 to 2010, resident Canada goose populations in the United States increased about 14-fold—from 250,000 to 3.5 million. In the Eastern United States alone, resident Canada goose populations exceed 1 million and have increased by 2 percent each year during the last 10 years. A main factor contributing to their dramatic population growth is their tendency to nest in urban and suburban areas, where the geese have ideal habitat with few predators and where hunting cannot be used to control the population. Geese prefer to land on water and to graze on grassy areas within sight of a body of water. Additionally, geese may concentrate nesting and brood rearing activities near water.

Homeowners, corporations, golf courses and farmers have sought ways to deter geese from inhabiting their property. Golf courses have used Border Collies, firecrackers, guns (blanks), decoys, balloons, wires, and general harassment. Farmers have tried propane exploders, scare flags, shell crackers, and hunters, all of which have proven unsuccessful at keeping geese from crops in the long term. Tests of early audio systems in agricultural fields deterred geese in some areas, while no effect was seen in others, and geese habituated to propane exploders as well. The distribution of Canada Geese is widespread, and their behavior has enabled them to thrive in urban settings. They therefore pose a greater potential risk to human health than other waterfowl. When congregations of birds remain in the same areas for long periods they can emaciate grass, nutrify soils (through excessive fecal deposits), and make public areas unusable for picnics, resting or general park activities.

The majority of Canada goose damage complaints involve accumulations of feces on lawns and walkways at homes, schools, hospitals, corporate campuses, and public parks. Goose feces damage property, compromise overall quality of life, and have the potential to pose serious health threats due to the presence of disease-causing organisms. Bird strikes—the collision between birds and aircraft—are among the most common aviation hazards. Bird strikes pose safety risks to passengers (e.g., 23 human deaths and 223 injuries from 1990 to 2011 in USA). With increases in the number of routes and flights, this threat is on the rise. Collisions between birds and aircraft (bird strikes) are expensive, risk human lives, and increase bird mortality.

Other damage associated with geese includes overgrazing of lawns and recreational fields, and goose aggression and human injury during the nesting season.

Waterfowl such as Canada geese may also pose serious flight safety hazards at airports. Due to their large body size, flocking behavior, and relative abundance in urban/suburban areas, geese have the potential to be involved in damaging bird-aircraft strikes that have resulted in loss of human lives, injuries, and substantial financial losses. Goose poop in a pond greatly increases the degree of chemical and bacterial remediation required to maintain a healthy pond environment. The costs for treating a pond with such chemicals and beneficial bacteria are significantly increased due to the presence of geese, and thus, by having a goose deterrent system as described herein, the ability to maintain a healthy pond is tremendously enhanced.

Such accidents cause annual damages that have been estimated at $700 million within the United States alone and up to $1.2 billion to commercial aircrafts worldwide. Additionally, damages in and around the facilities and aircrafts where birds nest and congregate cost millions of dollars in the man-hours needed for bird strike prevention and clean-up.

No Federal or State wildlife permit is required to harass geese, as long as they are not handled, harmed or killed. Many ways have been attempted to deter geese, with mixed success. Habitat modifications include alteration of vegetation and bodies of water to remove their attractiveness for geese. Unfortunately habitat management may also adversely affect the usefulness of the property for its intended purpose. Two chemical formulations are registered with the U.S. EPA as Canada goose taste repellents: methyl anthranilate (MA) and anthraquinone. The cost of the material (approximately $150-250/acre of grass) is cost-prohibitive for widespread use on private lawns. Past bird dispersal techniques also included the use of high volume audible alarms or explosives to disperse birds. These devices, however, are limited to rural areas where the intense noise did not disturb residents and are of only arguable effectiveness. Other examples of typical methods include reducing grassy areas, using shrubbery and foliage to cordon off water bodies, installing fences, utilizing noise makers to scare the geese away, and flavoring the grass with distasteful substances.

Many of the above recited methods are impractical, as reducing grassy areas and surrounding water hazards with shrubbery is inconsistent with the purpose of a golf course or athletic field. Utilizing noise makers such as cap guns or the discharge of blank shells necessarily upsets the serenity of these locations for humans as well as geese. U.S. Pat. No. 7,699,018 to Wells employs the use of solar powered lights to attempt to deter geese, but such lights are typically amber in color, have an industrial aesthetic appearance in otherwise pastoral settings, are expensive and their flashing yellow/amber light at dusk and through the night have caused neighbors to complain as to the annoyance created by such lights, adversely affect the quiet enjoyment of property owners, including even the owners of such lights. U.S. Pat. No. 8,667,930 to Homung is directed to an apparatus to avert waterfowl settlements that includes an elongated tubular housing having an end cap, a solar panel mounted on top of the housing cap to recharge a battery power source and a means to sense ambient light for device activation, preferably including bird spikes mounted atop a solar collector panel. Similar to Wells, however, the type of light used by Homung, creates an eyesore in a setting where such an unsightly addition defeats much of the purpose for many residents of having a water feature.

Other prior art methods have proven difficult to use for various reasons. Chemical repellants are expensive, have limited residual effect and may have currently unknown environmental consequences. Noise makers, such as air cannons, are not welcomed in residential areas and it is believed that they are of limited use because waterfowl adapt quickly to the sounds. Balloons and Mylar tape barriers are eyesores, distract from natural settings, are of controversial value and seem to offer limited results. Birds quickly learn that the playing of recorded distress calls is a false alarm and thereafter tend to avoid such warnings.

Thus, there have been many and varied approaches to deter geese from populating certain areas, all of which have mixed results in terms of effectiveness. Any means to limit the number of geese in particular areas and to reduce the associated damages they cause, would be of great value.

SUMMARY OF THE INVENTION

Perhaps one of the biggest challenges faced by prior art systems lies in the ability of geese to learn of the patterns, context, and set up of such deterrent systems and to then disregard such deterrent attempts. Avoiding habituation by employing a system and method that is cost effective, able to be modifiable in an easy and unnerving way to geese, while presenting warnings, whether they be visual or audible, or both, that avoid unduly hindering humans in their enjoyment of the properties where such devices are located, is a long sought but unsolved objective. The present invention provides a solution to these continued problems.

In various embodiments, the present invention is directed to a geese deterrent system and method that avoids geese from habituating to the light and sound signals intended to thwart their presence from a pre-designated area. Using the present system, geese do not acquire a comfort with such systems to then disregard such deterrent attempts. Employing a system and method that is cost effective, able to be modifiable in an easy and unnerving way to geese, while presenting warnings, whether they be visual or audible, or both, and that avoid unduly hindering humans in their enjoyment of the properties where such devices are located, is a long sought objective that is achieved via the present invention.

Geese have four retinal cones which allow them to see in the visible light spectrum as well as the UV spectrum. Homung, U.S. Pat. No. 8,667,930 teaches using an industrial appearing light emitting structure in order to temporarily incapacitate the visual defense system of a geese flock by flashing lights at a particular time of dusk, thereby making the zone seem unsafe to inhabit for the night and allegedly driving the flock from its location. Homung's invention is predicated upon an expressed belief that geese have something akin to a dark-adapted nighttime vision in humans and suggests using light in the green spectrum apparently due to Homung's speculation that the green region of the visual spectrum is the brightest color perceived by the rods in the eye at dusk and nighttime. Homung fails to appreciate, however, the importance of the aesthetic characteristics of a device to deter geese. Homung's device also involves the particular periodicity of his flashing lights, which geese quickly adapt to. His lighting device is unduly annoying to other humans in the area. Perhaps tacitly admitting his device's ineffectiveness, Homung also teaches that a bird spike be used to prevent bird roosting on his device.

U.S. Pat. No. 7,699,018 to Wells describes a tubular structure on land or floating in a pond where a single amber colored flashing light, is powered by a battery positioned above a floatation ring and a solar panel above the light. Wells single rhythmic cyclical flashing light pattern is not believed to be of particular effectiveness, and its construction requires an unaesthetic combination of an upper and a lower floatation tube with a sealing collar between them, along with a stabilizing floatation ring.

In contrast, in preferred embodiments the present invention employs a light that displays a wavelength spectrum that disturbs geese far more than it does humans, preferably with wavelengths that humans cannot perceive. Various embodiments of the present invention are directed to a method to drive away geese from a particular area by providing one or more lighting elements that comprise light emissions that are at or about a 409 nm wavelength, preferably employing LED lighting elements and preferably being powered via solar power and related batteries, and that preferably do not include wavelengths of light that would be considered annoying by humans, e.g. avoiding lighting elements that disperse a light having wavelengths above about 550 nm. In such a manner, and in contrast to prior art systems and methods, embodiments of the present invention are particularly useful in deterring the presence of geese, while at the same time, not establishing an unduly annoying lighting system for neighboring humans. The use of LEDs as the light emitters provides for very low electric power consumption and thus greatly extended battery life; high durability and long life. LEDs come in a selection of various colors including white, red, amber and green.

In various embodiments, the lighting elements are designed or programmed to flash intermittently, preferably at random time periods varying from about one second intervals to about 120 second intervals, more preferably between about 5 seconds and about 24 seconds, and most preferably between about 10 seconds and about 35 seconds. Even more preferably the sequence of flashing varies so that geese do not grow accustomed to a steady rhythmic blinking of flashing of lights. In a most preferred embodiment, the wavelength of light employed for the lighting element is around 409 nm and is such that a human cannot discern such light as it is below the limit of a human's spectrum of vision, but is within the vision range of geese. Thus, various embodiments of the present invention provide a novel and non-obvious advance in deterring geese by using a flashing light that disturbs geese but that does not unduly disturb or annoy humans as humans can barely, if at all, see such frequency of light being emitted. Such an advance over the prior art provides unique and extremely beneficial uses for geese deterring lighting in areas where such prior art lighting may not otherwise be considered. For example, having random flashing lights visible to humans around an airport could potentially cause confusion to pilots and actually impair safety, rather than advance safety concerns. By using the present invention, however, airport authorities can now position the present system in area where geese are to be deterred without such concern.

As it is known that different species of birds have different vision spectrums, with some birds having a vision spectrum that exceeds even that of geese, it is possible to provide a lighting system that employs precisely and preconfigured ranges of wavelengths of light to be projected in certain areas to deter specific types of birds. For example, birds of prey, such as hawks, eagles, etc. have a different spectrum of vision than do ducks and geese, and thus, in certain environments, e.g. in the area of wind turbines, where such birds of prey are often killed, such particularly designed and positioned lighting systems of the present invention can be used to prevent bird mortalities. Similar to the discussion above with respect to airport environments, the ability to provide deterrence lighting for particular species of birds in a given area without also exposing such area to a light wavelength that is found objectionable to humans, will expand the use of the present invention to save vast numbers of bird lives, as well as advance energy interests of humans without the controversy surrounding the establishment of wind mills and other similar types of energy producing equipment. One of skill in the art will also appreciate the uses of the present system and method to deter certain types of birds from colliding with buildings by the proper positioning of such lighting systems, tuned for the particular bird species one desires to protect, on or near buildings, such that the birds stay away therefrom.

In other embodiments, the system and method employ flashing light patterns that are adjustable to change in intensity and/or duration, or in the pattern of light pulses, in an unpredictable and random manner, in contrast to some prior art systems. This achieves the basic objective of repelling geese from a designated area of interest by precluding any habituation.

Still other embodiments of the present invention, in contrast to existing prior art systems, avoid the use of tubular components or housings to retain batteries, ballast, etc. Moreover, the present system has in certain embodiments, solar panels mounted not at the top most portion of a device (i.e. like many prior art systems) but rather in an area below or on the same level as the light, which in many circumstances, results in increased areas for solar collection, avoids the size and shape characteristics that having a solely top-most solar panel requires, and provides for a vast array of aesthetically pleasing structures to be employed for the purpose of deterring geese without having industrial looking elements in what are otherwise pastoral and natural environments. Indeed, it is believed that many potential users of a geese deterrent system have and will continue to opt out of using such systems unless the overall aesthetic concerns are addressed. For example, golf courses are prized for their pristine and yet finely manicured natural settings, which are effectively destroyed by the presence of an industrial looking geese deterrence lighting device, regardless of how useful it might be in deterring birds. There has been a long felt but unsolved need for a system and method that both addresses such overall aesthetic concerns, as well as being superior to prior art systems in deterring the presence of geese in such natural settings, such as a golf course, university and school grounds, parks, sports lawns, etc.

Below are descriptions of particular preferred embodiments of the present invention.

Golf Ball Washer—A system and method of repelling geese in and around a tee box area on a golf course, an area often populated with geese. Preferred embodiments employ an array of LED's generating a light spectrum of 350-550 nm wavelength, emitting light in random time intervals, patterns, and colors within a 90-360 degree pattern. The light source may be placed at eye level of the geese (e.g. 15-24" from ground level) and be mounted on a post that includes the golf ball washer and solar panel. A solar panel used to recharge batteries can be positioned in one of 3 locations. Location 1: on top of LED light source, Location 2: placed within the top of the ball washer basin, Location 3: above the ball washer basin and attached by a bracket, thus allowing for a larger panel. Rechargeable batteries can be located within the ball washer post assembly or in a separate sealed compartment within the ball washing basin. An ultrasonic signal in the 18 kHz and above range can be used in lieu of or in addition to the light source.

Pathway Light—A system and method of repelling geese designed to integrate within a home or business's present landscape lighting scheme. The pathway light consists of a mounting post employing an array of LED's generating a light spectrum of 350-550 nm wavelength, emitting light in random time intervals, patterns and/or colors within the light spectrum in a 90-360 degree pattern. The light source is adapted to be placed at eye level of the geese, 15-24" from ground level. A solar panel located on top provides the capacity to recharge the batteries located within the mounting post. A round disc shaped solar panel located on top of the unit is both a shield that prevents undesired light pollution of neighboring properties and also makes a design and artistic statement. The pathway light model can also utilize 12v, thus allowing it to be integrated within an existing landscape system. An ultrasonic signal in the 18 kHz and above range can be used in addition to the light source.

Dock Side Mount—A system and method of repelling geese from ponds and lakes. This embodiment of the present invention employs an array of LED's generating a light spectrum of 350-550 nm wavelength, emits light in random time intervals, patterns, and/or colors within a 180 degree pattern, utilizing a 12v power source. Mounted and attached to the side of a dock or pier structure this embodiment deters geese from gathering on the water of a pond or lake. In certain applications, especially those where 12v powered units are not deemed necessary due to the ability to power units via solar, several embodiments of the invention dispense with the need for 12v when there is insufficient availability. In embodiments that employ solar panels, such panels can be positioned within the dock or pier itself or in a more remote location, reducing the complexity and weight of the floating units.

Greens Flag/Pin Embodiment—Various embodiments of the present invention include a method and system of repelling geese from golf course greens and fairways by providing a configured greens flag/pin having a light source and solar panel associated there within. Preferred embodiments employ an array of LED's generating a light spectrum of 350-550 nm wavelength, emits light in random time intervals, patterns, and colors within a 90-360 degree pattern. The light source to be placed at eye level of the geese (e.g. 15-24" from ground level) to be mounted on the greens flag/pin, reversibly or integrally connected thereto. A solar panel to be located on top of the flag/pin with a rechargeable battery located within the shaft of the flag/pin. An ultrasonic signal in the 18 kHz and above range may be used in addition to the light source.

In various other embodiments, random flashing light units can be mounted in a decoy or other yard or water feature such that geese will be primarily exposed to flashing lights at about their eye level—e.g. preferably no more than about 2 or 3 feet above the ground.

Another aspect of various embodiments of the present invention involve the use of mirrors placed within about 75 yards of a randomly, unpredictable pulsating flashing light source such that geese who may attempt to turn away from the light source are still exposed to the flashing light via reflections in the mirrors, further confusing the birds and making them anxious, wary and thus, making them decide to depart the area. Thus, such mirrors can be employed even with prior art devices to accomplish the objective of deterring geese from an area. In one embodiment, mirrors at a size of 3×5 or 4×6 inches are mounted on posts that can be inserted into the ground around a light source, preferably at a distance of at least about 10 feet or more.

Similarly, another aspect of the present invention is directed to a geese deterrence system and method for employment at airports and airfields that repel birds from critical areas of the airport and runways, particularly to areas around aircrafts and other high value systems, thereby avoiding or reducing potential property damage and possible loss of life. The provision of both the random nature of the light pulsations, as well as the ease and low cost ability to vary the patterns by the use of moveable mirrors, etc. prevents the habituation seen when using prior art systems.

The frequency of light is one factor that is preferably adjustable to accommodate different situations. In most cases, however, a preferred system employs a flashing random pattern that even more preferably varies in its increase in flashing frequency in the range of 1 Hz to 7 Hz, and more preferably about 3.0 Hz. The purpose of such alterations in frequency and pattern is to avoid a flock of geese from becoming accustomed to any particular predictable series of flashes or frequencies. Certain embodiments of the present invention permit one to pre-program a lighting pattern, intensity, direction, color, duration etc. especially with these characteristics being random and unpredictable in nature.

In certain applications, especially those where solar powered units are not deemed necessary due to the ability to power units via 12 volt or more conventional power systems, several embodiments of the invention dispense with the need for solar powered complexities, including the need to recharge batteries, the predicaments encountered when there is insufficient solar power to adequately power units, etc. In such systems, as there is no need to shut the system off during the day, there is the advantage of having an 409 nm wavelength light employed even during the day and at dusk (prior to when prior art systems would turn on due to their solar powered nighttime coding of programs, etc.) and thus, even on cloudy days or extended periods where solar power may not adequately power geese deterrence systems, various embodiments of the present invention provide a 24/7 capability to deter geese from an area. This is especially advantageous when the light employed to deter the geese is below the human ability to see such light spectrum, but is still visible to geese. Thus, a human would not otherwise appreciate that the lighting system was on during the day (or the night for that matter.) The embodiments that do not require solar power also eliminate the need for the costly and weighty battery systems of prior art systems. Several embodiments of the present invention employ an array of LEDs to provide several distinct light spectra emissions, with the appreciation by the present inventors that light emissions in the 350-600 nm wavelength and with a random time interval and color pattern, and especially in more preferred embodiments employing a light with a wavelength of about 200-410, more preferably 350-410, and most preferably having a 409 nm wavelength, it is possible to deter geese from a particular area. Moreover, several embodiments of the present invention dispense with the need for use of an array of LEDs to provide several distinct light spectra emissions, and instead, with the appreciation by the present inventors that the 409 nm wavelength is one that particularly disturbs geese and is one that is not particularly perceptible by humans, there is no need for a provision of distinct light spectra emissions—but rather, one will do. Moreover, various embodiments are devoid of the use of microcontroller circuitry including those that require a preset code, etc for operation. Instead, a pre-programmed random black light system is sufficient to deter geese.

Yet still other embodiments are directed to decorative pond features, such as water fountains, but that further have lighting and or sound elements as described herein that are effective to deter geese and other birds from an area around a pond. These functional features can be incorporated as a part of decoys that resemble living animals such as those that may be found around a water feature. Incorporated herein by this reference is U.S. Pat. No. 6,179,218 to Gates. Other embodiments employ one or more lasers that are reflected off of a structure near where geese may gather, such as a golf green, where the laser is reflected off of a flag pole or other structure. The moving of the flag pole for different hole positions within any given week facilitates the random and periodic moving of the structure such that geese will not grow accustomed to a particular light source. The laser beam employed may have a wavelength that is able to be seen by birds or other animals and that merely frightens them away rather than blinding them. In certain embodiments, the patterns and speed of light scanning devices are preferably variable and controlled by a control system.

The range of wavelengths of the light beam is preferably from about 200 nm to less than about 633 nanometers, and most preferably between about 200-400 nm, but in some instances including about 409, up to about 470 nm. At about 409 and above, a blue light is particularly seen by geese and not as much by humans. It is known that a goose's eyes are sensitive to both ultraviolet light and human-visible light. The above approximate wavelengths are preferably selected to maximize impact to a goose's eye by choosing wavelengths which are within the overlap area of ultraviolet and human-visible light, but sparing the human annoyance occasioned by having a highly visible light randomly pulsating in a yard or on a water body. The visual acuity of birds and man is similar, but the visual acuity of birds is a bit greater than man's and a bird's rate of assimilation of detail is higher. These differences are employed to provide geese deterrence systems that do not annoy humans.

Humans are able to see colors through three retinal cones that perceive the three primary colors: blue, green, and red. This is termed "trichromic vision". These colors are within the visible spectrum of light (400-700 nm). Most birds, including geese, have "tetra chromic vision" meaning they have the ability to perceive four colors through four retinal cones. Similar to humans, three Of the retinal cones perceive the primary colors. The extra cone perceives ultraviolet light (UV; 200-400 nm).

Another benefit of the present invention is that the quality of the water in ponds is adversely affected due to the tremendous amounts of manure produced from a single goose, let alone a flock. Thus, especially used in conjunction with the invention set forth in the parent application (now U.S. Pat. No. 9,016,290, incorporated herein by this reference), the present invention enables a pond owner to have a far cleaner pond than they would otherwise, with the decrease in goose poop enabling one to avoid the often expensive use of chemicals and beneficial bacteria to otherwise counteract the negative effects of goose manure.

The light features of the present invention—and it may be more than one—can be mounted on several places on a floating structure, such as a decoy, including the head, back, tail, etc. is therefore reduce the amount of goose poop in a pond.

In birds, each cone cell contains a tiny drop of colored oil that human cells lack. The oil drop functions much like a filter on a camera lens. The result is that birds not only see UV light, they are much better than humans at detecting differences between two similar colors. Thus, since birds can detect more colors than humans can, scenes may appear more varied. And colors that already are bright to human eyes are—if amplified by UV reflectance—probably even brighter to birds. The Canada goose possesses an oblique rather than horizontal visual streak at the ganglion cell layer. Using micro spectrophotometry, it has been found that the Canada goose has a violet-sensitive visual system with four visual pigments with absorbance peaks at 409, 458, 509 and 580 nm. The Canada goose oblique visual streak is the retinal center for chromatic and achromatic vision, allowing individual birds to sample the sky and the ground simultaneously or the horizon depending on head position. This is in contrast to other vertebrate species, who have horizontal streaks (parallel to the ground when the head is up). Overall, the Canada goose visual system has features that make it rather different from that of other vertebrates living in open habitats. The Canada goose is a highly social species that uses different visual displays for social communication such as pair bonding, coordination of pre-flight movements and agonistic interactions. The present invention plays off of the characteristics of geese in designing effective deterrent systems and methods in a fashion that prior art devices simply failed to appreciate.

Certain aspects of the present invention are directed to the use of lasers and flashing lights at times other than the dusk or twilight hours as it is submitted that geese track possible locations for bedding down well prior to such hours in a day. Thus, by having geese deterrence in place and active prior to the time the prior art devices are employed, the preset invention can be viewed as distinct from such prior methods and philosophy.

In contrast to prior art systems, various embodiments of the present invention do not employ a housing tube having a light source mounted on an upper end of a tube, nor a solar cell mounted above a flashing light source; nor a battery disposed in such a housing tube below a flashing light source, and does not have a ballast tube, and certainly no such ballast tube mounted below a housing tube. Due to the absence of such housing and ballast tubes, the present invention avoids the need for any sealing collar that couples such tubes together. Moreover, various embodiments do not include a separate floating member associated with any housing or ballast tube, especially not any floating member disposed above such a floating member. While a battery can be positioned in various places within the decoy features as disclosed herein, it need not be, and preferably is not, disposed above any particular floating member, and in some preferred embodiments having a battery positioned so as to act as (and sometimes supplant) the ballast that may be desired in a floating decoy. In certain embodiments, a ballast is not enclosed within a tube, but rather, is either relatively free in the body of a floating decoy or is otherwise associated with a floating decoy in a fashion such that it can be added (e.g. an amount of sand) in the lowermost portion of a decoy. Any of the floating decoy embodiments of the present invention can be anchored in a water body using any of a variety of anchor mechanisms well known in the art.

Preferably, in embodiments that employ solar panels, such panels are not positioned above the light source, principally so that the area of the solar panel can be extended over the larger surface of the decoy, with the light source itself preferably being positioned above the solar panels and in a position so that the light source can shine in a direction and on a plane such that it maximizes the directional orientation of pulsating lights towards the approximate height of Canadian geese.

One will appreciate that this summary of the invention is not intended to be all encompassing and that the scope of the invention nor its various embodiments, let alone the most important ones, are necessarily encompassed by the above description. One of skill in the art will appreciate that the entire disclosure, as well as the incorporated references, pictures, etc. will provide a basis for the scope of the present invention as it may be claimed now and in future applications.

Figure 1:
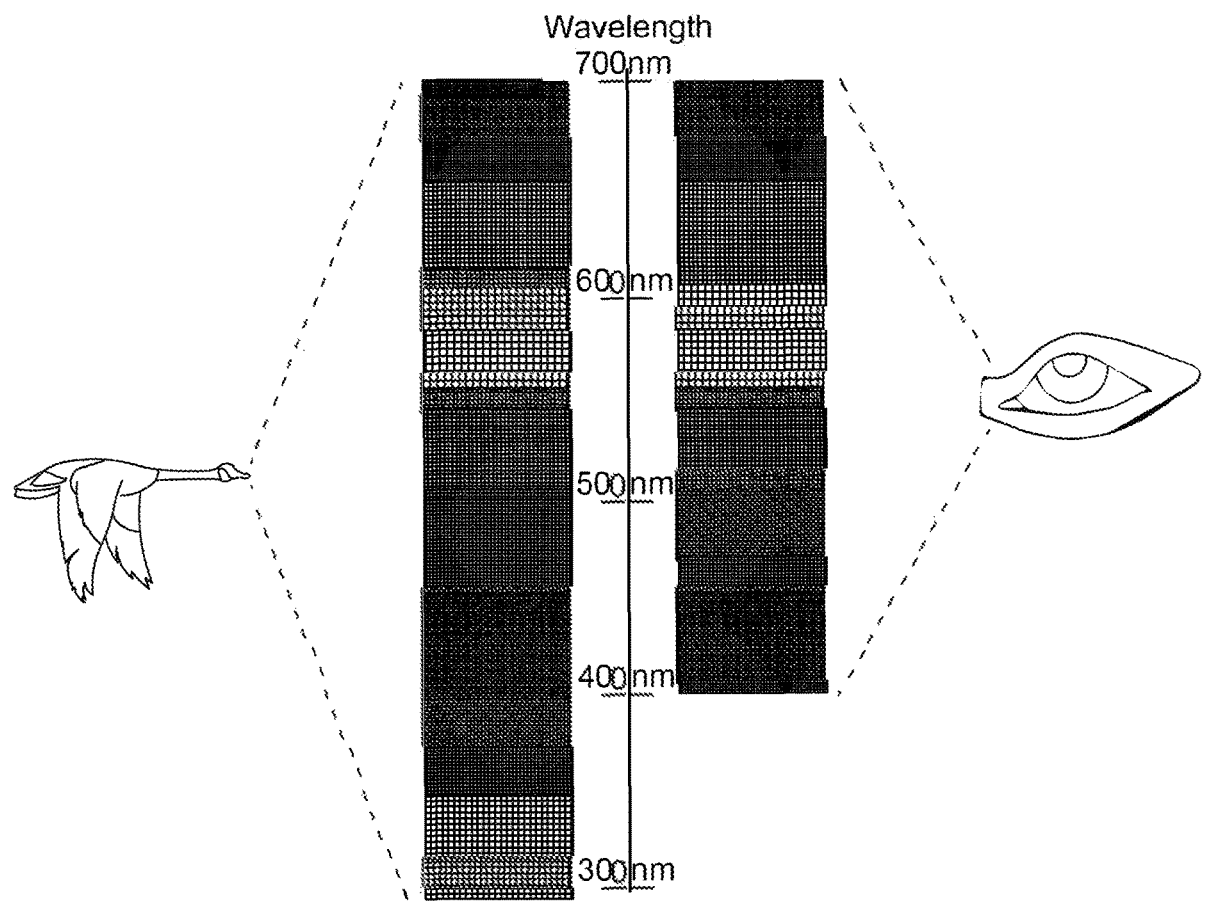
FIG. 1 illustrates the respective vision spectrum of a goose and a human.
Figure 2:
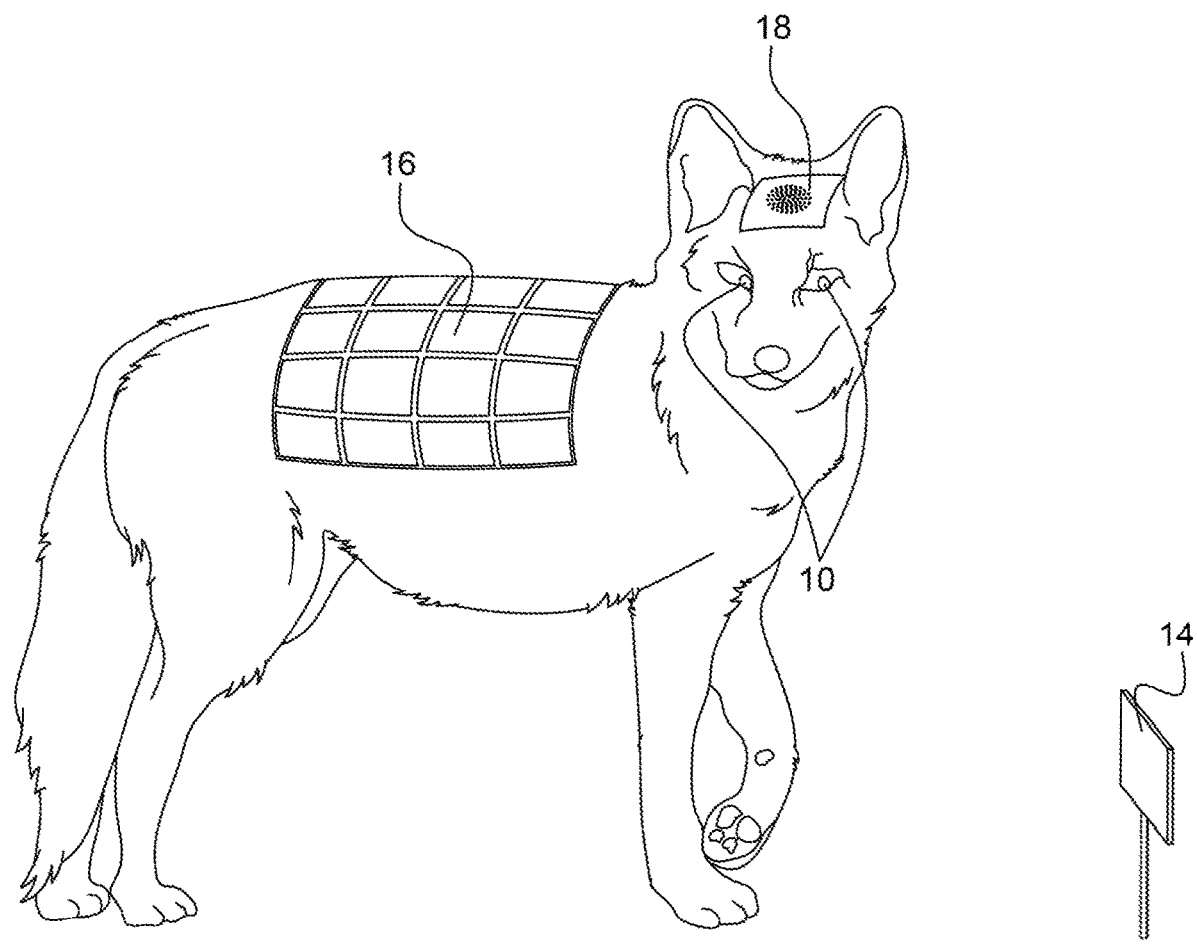
FIG. 2 is an embodiment depicting a coyote decoy with a solar panel positioned on its back.
Figure 3:
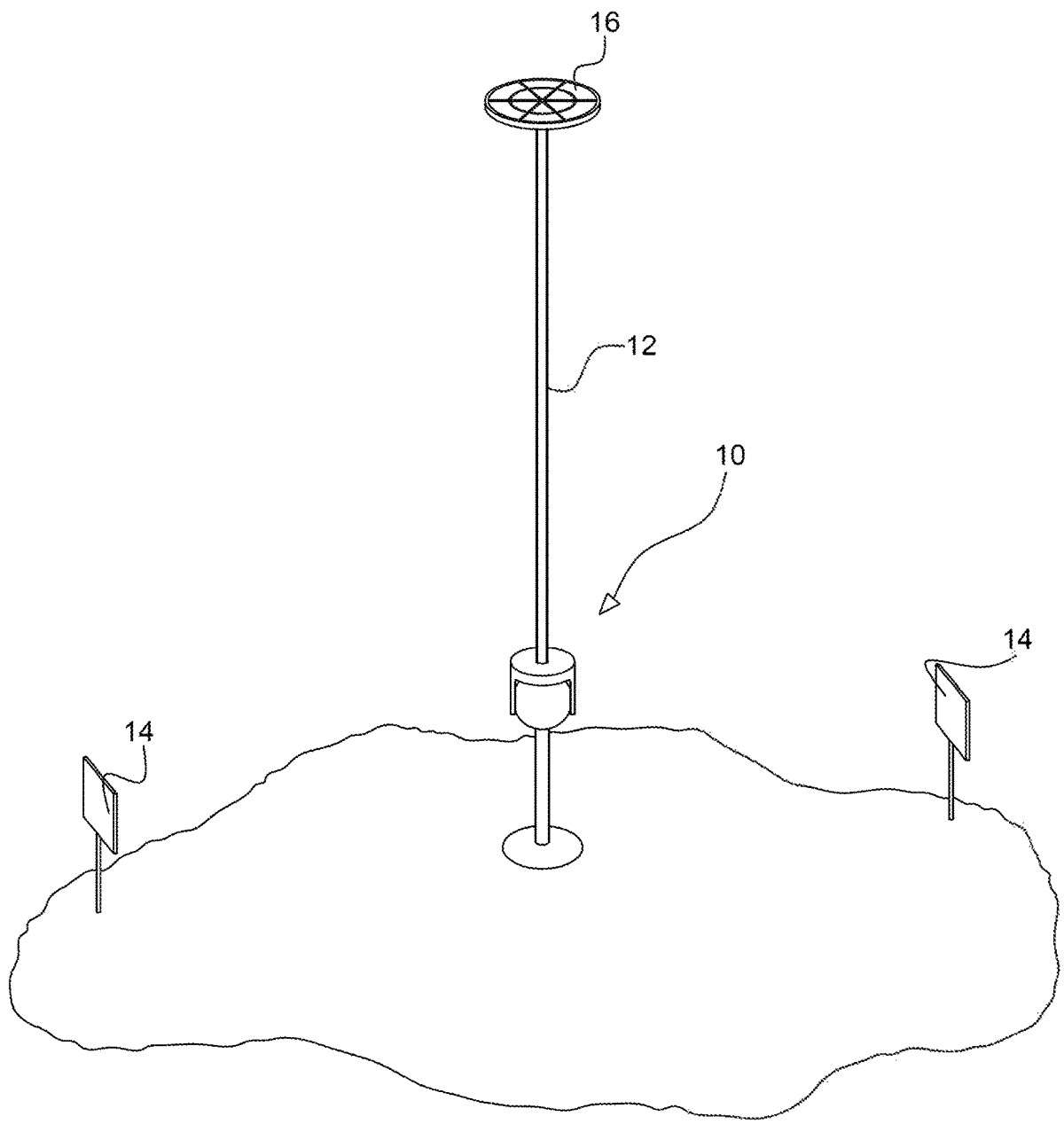
FIG. 3 shows an embodiment that employs a golf course flag having a LED randomly flashing light source as a portion of a deterrent system of the present invention, with mirrors mounted on separate structures to reflect the lights emanating from the flashing light source.
Figure 4A:
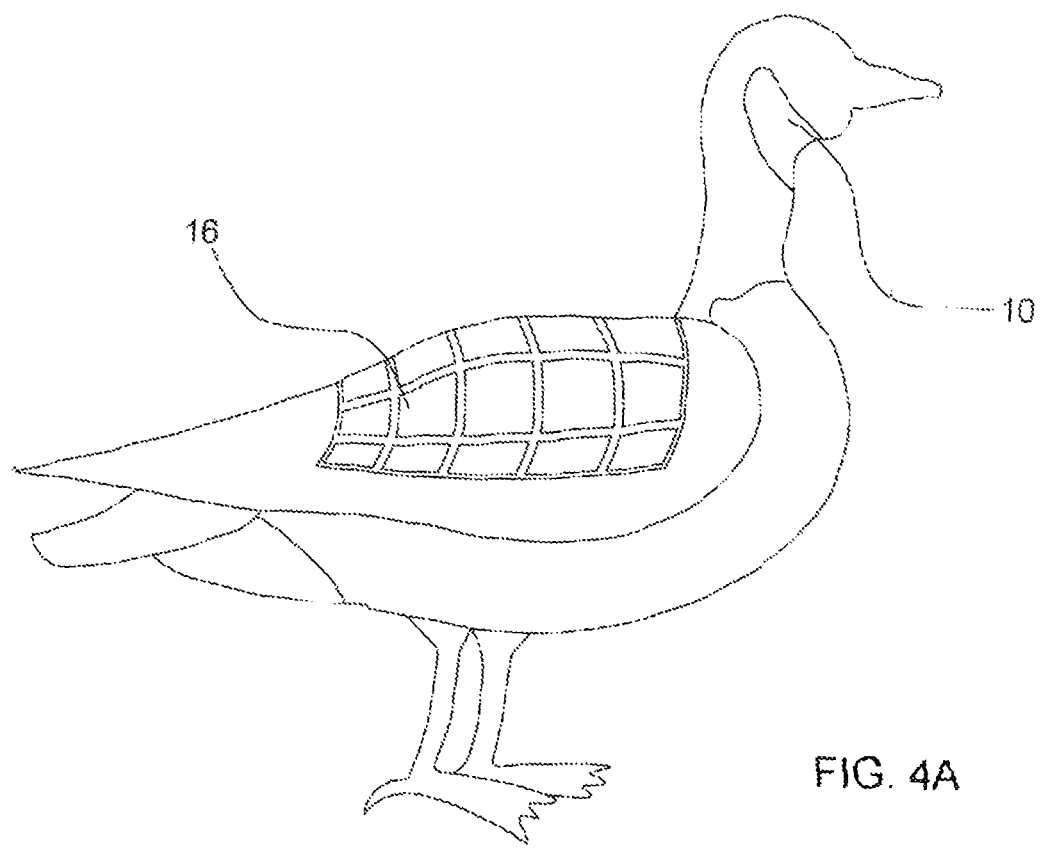
FIG. 4A is a depiction of a particular goose decoy including a solar panel across the back portion and a light element above such solar panel.
Figure 4B:
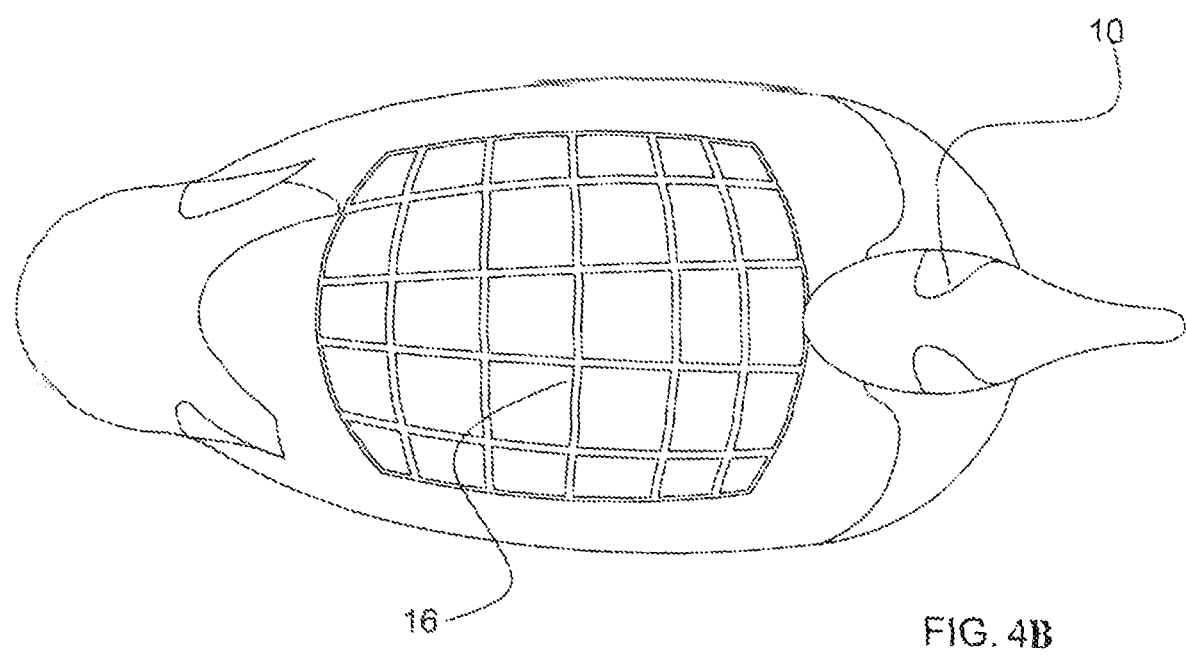
FIG. 4B is a top view depiction of a particular goose decoy including a solar panel across the back portion and a light element above such solar panel.
Figure 5A:
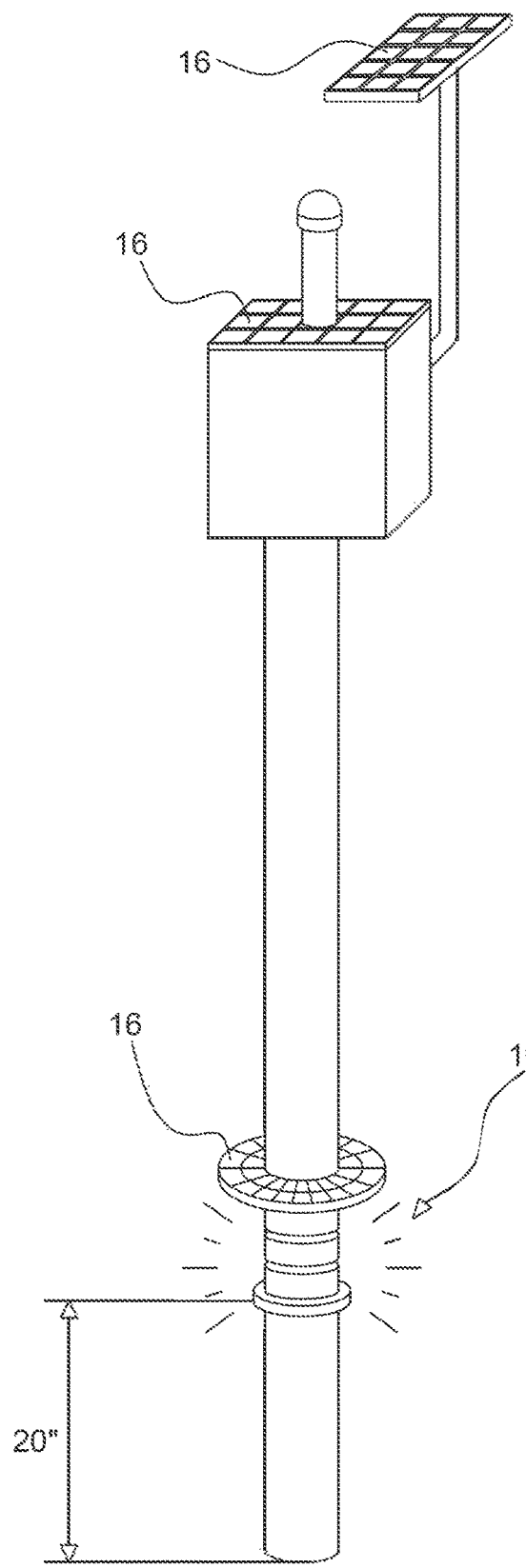
FIG. 5A shows another embodiment where aspects of a geese deterrent system are incorporated into a golf ball washing structure.
Figure 5B:
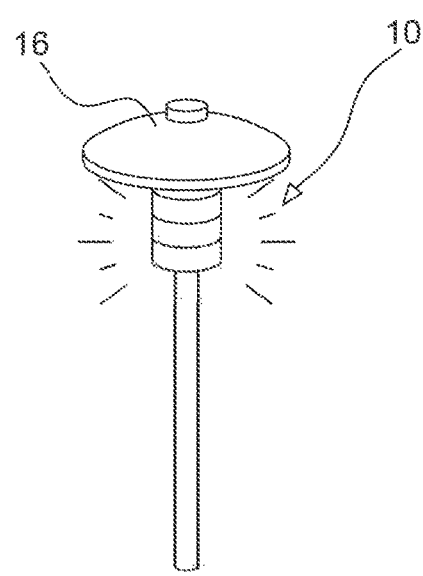
FIG. 5B shows another embodiment where aspects of a geese deterrent system are incorporated into a pathway light where the upper portion is a solar panel and the light is a 360 degree illumination.
Figure 6:
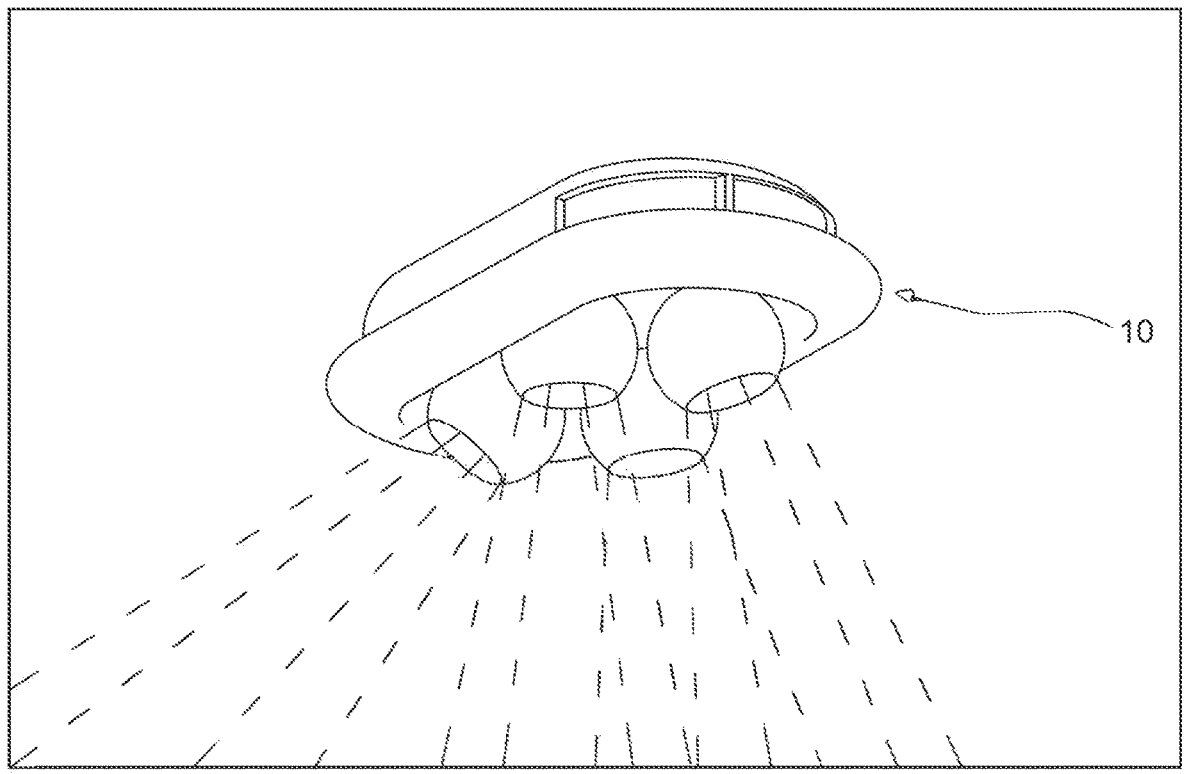
FIG. 6 shows another embodiment where a drone hover craft is provided with lights to deter geese from remaining in an area.

As may be appreciated from the various illustrated devices set forth herein, one advantage of the present system over prior art systems has to do with the ability to avoid habituation caused by geese witnessing the same structure, emanating the same wavelength light, with about the same pattern, and basically in the same position, night after night, thus facilitating habituation by the geese to such initially effective systems. In contrast to the prior art systems, due in part because the holes into which golf flags that are associated with the present system, are inserted are moved periodically, sometimes weekly or daily, around any given green, facilitating the change of appearance to geese that is believed to be instrumental in deterrence. This alone facilitates the desired variety in how a deterrent system is perceived by the geese and makes them question their surroundings in a much more long-standing way. Moreover, in preferred embodiments, the vertical positioning of a light generating device 10 that is securable to a golf flag pole 12, can be varied in its position of attachment, such that geese are precluded from ever feeling comfortable with a particular setting on a golf course. In particular, when such a system is used in conjunction with a plurality of mirrors 14 that are positioned such that the light emitted for one or more units 10 is reflected via such mirrors 14, further makes the geese wary and unassured as to where the source of the light source is. In other embodiments, the ability to have the light source 10 remotely positioned and then directed toward a flag pole 12 on a golf course permits a user, especially in concert with the use of pre-positioned mirror 14 structures that reflect light that is projected remotely but that reflects off the flag pole 12 (which is provided with a reflective surface to facilitate such reflection of light to distantly positioned mirrors 14) so as to deter geese without having to have the light source 10 located directly in the area where geese may rest and where it is desired to have them depart.

Various embodiments of the present invention include a method of repelling geese by providing a decoy having a solar panel 16 associated therewith, such panel 16 employed to charge a resident battery inside the decoy, with such panels preferably on the body of the decoy and positioned below a randomly flashable light source 10, and having the decoy positioned either in a water body or within 50 yards thereof, such that the light source 10 is positioned such that the light is principally directed to the level of the geese eyes when flashing and preferably having a wavelength selected from the following nm: 409; 458; 509, 550 and most preferably, 409.

Another aspect of many embodiments is the light shield aspects of the system so that annoying illumination of light that can be perceived by humans is kept to a minimum. While not preferred, if lights are employed that emit wavelengths that are visible by humans, the shields of the present invention are adapted to block light above the eye level of geese such that neighboring property owners do not experience the annoying flashing lights. One particular embodiment of the present invention is adapted to attach to the circumference of even amber lights, as employed by Geese Away, thus blocking the emission of light from such elements in a direction directly opposed to the ground. Preferably, the decoys described herein also have a light shield to ensure that the majority of the light emissions are directed laterally so as to be projected towards the eyes of a geese in the area and do not annoy humans.

Perhaps contrary to common appreciation, the provision of a startling light in a decoy of a goose is particularly effective at deterring other geese from remaining in the area of the decoy, presumably due in part to the fact that the goose decoy appears to the other geese as a sentinel goose whose job is to warn others of the gaggle of danger. When such a goose figure displays the disconcerting flashing lights 10 at eye level of the other geese, the geese get wary, confused and ultimately leave the area. The fact that the single goose decoy remains is believed to be of little consequence in terms of geese falsely believing that the area is safe. As many geese in any particular area are resident geese, once such a geese gaggle has experienced the frightening spectacle of a "black-light", a blue and/or purple randomly flashing light 10 emanating from a goose decoy, such geese retain such unpleasant memories and fail to return to that site. Use of positioned mirror 14 structures within about 75 yards from the source of the light emission 10, especially if it is emanating from a decoy or from a light projector associated with a golf pin 12 or other golf course structure, creates further confusion to geese and thus, enhances the desired wariness instilled in geese so that they avoid particular areas. In other embodiments, while other predator decoys (such as the Owl, coyote, snake, etc. of the geese) are effective in their own right, the goose decoy lighting system 10 of the present invention is believed to be both counter intuitively unique and effective as a goose deterrent, while also blending in with the natural environments at issue, including a golf course. It is believed to be counter-intuitive to have a goose decoy device positioned on a golf course in order to deter, rather than attract geese. This teaching away from the prior art is believed to be particularly novel and non-obvious.

In preferred embodiments, the flashing light 10 rotates periodically, either in 360 degree circles or in other selectable angular repeated rotations such that an area is traversed by flashing light 10 in a fashion that further makes geese uncomfortable, and in preferred embodiments, the rotations are random so as to avoid habituation of geese to such units. Having such flashing light 10 units moveable, especially via remote control, as one of skill will appreciate, can be achieved via technology provided in remote controlled toy vehicles, etc. and can further enhance the anti-habituation geese aspects of the present invention. Moreover, drone craft of various sorts can be employed that are fitted with either or both sound 18 and light emitting units 10 such that a hovering drone vehicle can be employed to target areas where geese have landed so as to scare them away. U.S. Pat. Publication 20150035437 to Panopoulos is incorporated herein by this reference in this regard to provide written description and enablement for various devices that, with the guidance provided herein, can facilitate systems and methods for deterring and driving away geese from particular areas of land or water. Having the drone resemble a bird of prey is one preferred embodiment of the present invention, such that geese will be harassed by the appearance of such a predator, as well as by either or both sonic 18 and light signals 10 that disturb and repel such geese from remaining in an area.

In some preferred embodiments, at least two, and preferably three sentry geese decoys, fitted with at least one of, and preferably both of, the light 10 and sonic emission 18 features as described herein, is operably connected to a solar-powered 16 device for powering the light and the sound emanating devices, such that preferably both the light 10 and the sound 18 is scarcely noticeable to humans but is very disruptive to geese, causing them to find another habitat.

Instead of prior art systems that flash in predictable time periods, preferred embodiments purposefully have a random flashing pattern that leads to geese not being able to grow accustomed to the flashing non-patterns. Thus, the system and method of the present invention is preferably a solar-powered 16 light 10 charged each day and preferably randomly flashed at least in a 90 degree angle, more preferably in a 180 degree arc and in some embodiments in an arc of 360 degrees, preferably from dusk to dawn, at eye-level of the geese and at 409 nm.

One aspect of the present invention, in the context of using goose decoys as a select version for deterrence, is to use at least three sentry geese decoys fitted with the visual and sonic systems as set forth herein. Geese hunters appreciate that setting out decoys to attract geese must be done in a natural fashion to achieve the comfort level of the geese to land in a pattern of decoys. Thus, it is believed that having a majority of sentry geese as decoys, rather than resting or sleeping geese decoys, is important as it signals to overflying geese that there may be danger. Goose hunters prefer to have 1 sentry to every 10 feeder decoys. It is believed that if you have too many sentry decoys, incoming flocks may think they are actually on alert. Thus, having at least a plurality of sentry geese further acts as a deterrent to having geese flocks land in the first place. Moreover, when the sentry decoy goose emits disconcerting lights 10 and sounds 18, the live geese are even further concerned and wary and thus, fly away from the area.

DETAILED DESCRIPTION OF PREFERRED EMBODIMENTS OF THE PRESENT INVENTION

Various embodiments of the invention are now described with reference to the Figures. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of some of the embodiments of the invention.

As described herein, various embodiments employ the use of either or both sound 18 and lights 10 with a decoy so that one avoids the industrial lighting appearance of prior art devices that are intended to deter geese from an area. Examples of decoys are disclosed in U.S. Pat. Nos. 6,412,210; 6,487,811; 6,760,993; 7,117,628; 8,485,856; 9,078,425; 7,411,504; and U.S. Patent Application Publication No. 2013/0014423 all of which are expressly incorporated herein by reference for al purposes. To further comply with written description and enablement requirements, the following patents and patent publications are also incorporated herein by this reference in their entireties: U.S. Pat. No. 9,055,737 to Matzel, U.S. Pat. No. 7,699,018 to Wells; U.S. Pat. No. 8,226,260 to Whalan; U.S. Pat. No. 8,667,930 to Homung; U.S. Pat. No. 6,575,597 to Cramer; U.S. Pat. No. 6,435,422 to Wutschik; U.S. Pat. No. 6,179,218 to Gates; U.S. Pat. No. 5,040,726 to Dimitri; U.S. Pat. No. 5,193,808 to Takeshi and U.S. Pat. No. 6,176,047 to Morningstar. Thus, decoys that are land based, as well as those that are water based can be employed. In one embodiment, the decoy is a shark fin that floats in the water and appears as if it is the fin of a shark extending out of the water, with a light element 10 such that light emanates from one or both sides of the fin. Alternative decoys can be of an alligator or crocodile, with similar light elements 10 and solar panel elements 16 floating above the water.

While one focus of the present invention is to address the considerable issues relating to geese populations, other aspects of the invention are directed to other avian species and for the protection of pond dwelling creatures that are prone to be eaten by birds. Thus, Cormorants, herons and other predatory species of birds which prey on fish often flock towards bodies of water such as ponds which hold fish. The birds prey on these fish and deplete the number of fish in the Pond. These birds however are known to fear crocodiles and the like which in turn prey on these birds. The various decoy features, especially those having the light emitting elements 10—even more preferably tuned to address those particular bird species (e.g. as not all birds have the same vision characteristics as geese, and thus, lower or higher wavelengths may preferably be employed to ward off certain distinct bird species). A variety of decoy types can be employed for such purpose, as one can discern from the figures, and may for example, include: turtles, toads, hippos, crocodile's, alligators, shark fins, etc. Preferred embodiments of the present disclosure provide a life like three-dimensional version of a real animal that is accurate.

In preferred embodiments, the decoys of the present invention do not also employ audible noises to attempt to scare geese. It is believed that as with the annoying nature of rotating amber lights of prior art devices, the interference with another's quiet enjoyment of their properties due to an adjacent property owner wishing to deter geese populations present a problematic situation. Having said this, in certain embodiments, the use of audible signals 18 to unnerve geese is another aspect included in various embodiments of the present invention, thus including the use of an audible spectrum that only birds can hear, instead of humans. Incorporated herein by this reference is U.S. Pat. No. 8,164,462 to Bose; and U.S. Pat. No. 6,250,255 to Lenhardt. Importantly, and while not bound by theory, prior reports as to the hearing range of geese are in dispute. The present inventors believe that geese can indeed hear sounds outside the normal hearing range of humans, and it is this particular aspect of geese hearing that forms the basis for several of the embodiments set forth herein. Indeed, it is believed that prior reports that geese cannot hear ultrasonic sounds is inaccurate and has thus steered those of skill in the art away from even attempting to provide deterrent systems that employ ultrasonic signals to deter geese. It is known that a dog whistle emits ultrasound at a frequency in the range 18-22 kHz. It is believed that geese can also hear sounds having a wavelength of about that same range, more preferably about 20 kHz. Some in the prior art have stated that birds, including geese, have an upper limit of hearing at about 10 kHz.

Many in the prior art deny that geese can hear ultrasonic emissions, e.g. Ferguson, et. al. has expressed the opinion, now believed to be bereft of factual support, that birds hear the same level as humans; Birds don't hear ultrasound; birds cannot hear ultrasound frequencies and the ultrasonic devices don't work; and ultrasonic devices using frequencies between 15 and 30 kHz are completely ineffective save for a few song birds. Such a teaching away from many embodiments of the presently claimed invention is striking and renders the novelty and non-obvious character of the claimed invention more apparent. Indeed, it is now believed, in contrast to prior representations to the contrary, that the majority of birds can hear to 29 KHz and thus can respond to ultrasound.

U.S. Pat. No. 8,718,297 and 2015/0230450 to Norris, which are incorporated herein by reference in their entireties, inform one of skill in the art as to particular details useful in providing various written description and enablement disclosures for the present specification. In general, a deterrence system in certain embodiments includes any of a number of ultrasonic emitter 18 technologies. These can include, for example, piezo electric emitters, electrostatic emitters, or other ultrasonic emitters. Likewise, any of a number of modulation schemes can be used to modulate audio content or other information onto an ultrasonic carrier, and the modulated signal can include double side band and single sideband modulation.

The ultrasonic signal itself, without modulation, can be used to deter intrusion and can cause geese to retreat or move away from the sound. Humans are not capable of hearing the ultrasonic signal itself. Contrary to what Norris expresses, however, it is simply not accurate that birds, and especially geese, are not capable of hearing an ultrasonic signal.

Thus, use of an inaudible (to human) ultrasonic signal 18 impinging on geese results in an auditory signal being generated within the head of the bird. Without being bound by theory, whether the geese actually hear such signals or whether such signals have the practical effect of causing the deterrence desired, matters little. The important fact is that employment of ultrasonic signals can positively affect the objective of deterring geese from a certain area where ultrasonic signals 18 are generated and communicated. In one embodiment, a frequency for the ultrasonic signal 18 is in the range of 15 kHz to 20 kHz, which may produce a subharmonic at F/2 in the range of 7.5 kHz to 10 kHz. Indeed, as stated above, it is now believed, in contrast to prior representations to the contrary, that the majority of birds can hear to 29000 Hz and thus can respond to ultrasound. Prior art investigators have arrived at opposite conclusions than the findings and beliefs of the present inventors, including prior art commentators contending that "birds have not been shown to be able to detect sounds at high frequencies. Therefore, ultrasonic repellents are not useful" (Belant & Martin, 2011); "birds, unlike some mammals, do not hear ultrasonic (<20 kHz) sounds (Schwartzkopff 1973, Dooling 1982); etc. Thus, in one embodiment of the present invention, in conjunction with a randomly flashing light 10 at about 409 nm wavelengths mounted within one of the described decoys set forth herein, or mounted or as an integral part of golf course structures, including golf flag poles 12, ultrasonic (to human) sound emitters 18 are useful in achieving the desired deterrence of geese. In one embodiment, for example, a QB-4 ultrasound roughly (30 kHz, 80 db @ 0.5 m) device 18 is included within the interior of a decoy and is then able to project ultrasonic signals at least 25 feet, and more preferably about 50 feet from the decoy to deter the presence of geese.

Even devices that attempt to combine sonic and visual geese deterrence elements fail to appreciate the subtle but important aspects of the present invention, including the features of having the random and unpredictable sonic 18 and light flashing elements 10 housed in a suitable decoy, preferably a goose decoy, and in other embodiments, natural predators of geese, and most preferably in this regard, coyote decoys. A suitable sonic system 18 mounted inside such a decoy (insulated inside the cavity of such a decoy) and having suitable speakers to broadcast the preferably ultrasonic emissions 18 that can reach about 50 feet from such a decoy, is particularly effective when used in conjunction with the flashing lights 10 as described herein, especially those that are not amber in color, but rather that emit essentially wavelengths in the blue-purple spectrum, and most preferably at about 409 nm wavelengths.

Birds are especially sensitive to pitch, tone and rhythm changes and use those variations to recognize other individual birds, even in a noisy flock. Birds also use different sounds, songs and calls in different situations, and recognizing the different noises is essential to determine if a call is warning of a predator, advertising a territorial claim or offering to share food. Thus, one aspect of the present invention is to include such sonic signals 18 to thwart the presence of geese at a particular location by randomly providing such signals 18 such that they can be heard by geese and in such a manner, deter geese from remaining in a particular area.

For birds, hearing is second in importance only to vision for monitoring the world around them. In general, frequency discrimination in birds is only about one-half or one-third as good it is for humans within the 1-4 kHz range. A problem that birds suffer that is similar to humans is damage to the auditory receptors (hair cells) from loud noises. The sound intensity that produces damage and the amount of damage produced differs depending on the species. Birds residing in the active areas of airports might be constantly subjected to sound pressure levels that damage their hearing. Thus, the use of louder deterrence signals is not necessarily effective and indeed, can damage the hearing of geese such that such loud sounds are no longer effective in deterring geese. This is a counter-intuitive finding and thus, certain embodiments of the present invention are specifically designed so that damage to geese hearing is not involved by transmission of the sound signals, thus rendering such repeated signals effective as a deterrent. More is not always better when it comes to sound. What prior art sound deterrent systems failed to appreciate is that sound emissions in the ultrasonic range 18 are the most important. The misconception that humans and birds have similar hearing abilities and reactions to such sounds has resulted in ineffective sound deterrence systems being employed in the prior art. Thus, one aspect of the present invention, in a teaching away from the prior art, relates to eliminating or reducing the use of loud sound cannons to scare birds—as all that such systems achieved was in deafening geese so that they eventually did not care about such loud noises. Instead, a much more refined system is called for to thwart the presence of birds in an area by employing sounds (and sights, as elsewhere discussed herein) that lead to the birds preferring to be elsewhere. At the same time, if both sound 18 and vision elements 10 are selected that effect birds but that do not unduly annoy humans, then such aspects should be administered in bird repelling devices and methods. The present invention accomplishes this general objective by refining the prior art systems in a manner that selectively administers precise wavelength and audible sound wave presentations so that the basic objective of deterring birds from a pre-designated area is achieved in a manner that avoids the habituation issues experienced by prior art devices. In other words, a sledgehammer does not render a scalpel obvious.

In preferred embodiments, the described systems that employ sounds 18, as well as the wavelength spectrums 10 as set forth herein, employ sounds 18 selected in the high range of geese hearing, such that above at least about 10 kHz and most preferably at least about 15 kHz, and more preferably around 20 kHz be employed.

Various embodiments include the use of decoys that include lighting 10 and/or sound systems 18 that achieve the general goal of avoiding habituation of geese to the deterrence lights 10/sounds 18 from the devices as described herein. Additional embodiments may also be configured to include reflective and/or glow in the dark accessories for night applications (e.g., eyes) of the decoys and may even include a motion sensitive solar powered light 16. To comply with written and description requirements, the following are incorporated herein by this reference: U.S. Pat. Publication No. 2014/0241128 to Donoho; U.S. Pat. No. 6,906,472 to Wong; U.S. Pat. No. 7,506,815 to Speigel; and U.S. Pat. No. 9,055,737 Matzel et al. Still other embodiments of the geese deterrent devices of the present invention can optionally include one or more sensors operatively coupled with a processor to assist in controlling which lights, wavelengths, frequencies, pulsations, sound(s) to use, and timing of displays, etc. and in this regard, the following are incorporated herein by this reference: U.S. Pat. Publication No. 2012/0113754 to Husseiny; U.S. Pat. No. 8,934,319 to Donoho; and U.S. Pat. Publication No. 2013/0058740 to Jincks. Both infra sound and ultrasound devices 18 can be employed in the present invention, however, ultrasound is preferred due to the belief that it is most useful in concert with the visual aspects of geese deterrence as described herein.

Still other embodiments are directed to birds and animals other than geese, such as systems and methods to scare away Great Blue Herons, raccoons, and other common koi pond predators through a combination of a motion detection system which triggers an auditory and/or movement response from a variety of common enemies of koi pond predators and fanciful creatures intended to frighten koi predators. To employ such systems and methods the light sensing and sound sensing of particular species can be assessed and then appropriate deterrence provided in accordance with the various teachings of the present invention.

Photoreceptors of geese are able to absorb light strongly at violet (409 nm), blue (458 nm), green (509 nm) and yellow (580 nm) wavelengths. Plotting the distributions of the cones across the retina, scientists have found that the photoreceptors were most densely packed where they coincided with the inclined visual streak, and they suspect that the distribution allows geese to simultaneously see the sky and ground clearly. So the Canada goose's vision is well suited to its flocking lifestyle, and allows it to survey its surroundings. In various embodiments, use of black light 10 is employed as it does not distract humans, while it serves to disturb geese. UV-A light (320-400 nm) is UV light with the longest wavelength, and the least harmful. It is more commonly known as "black light", and many use its ability to cause objects to emit fluorescence.

Another aspect of the present invention is to locate the systems as described herein in airport environments to lessen the occurrence of collisions with birds, and particularly with geese. Similar approaches could be adapted for stationary obstacles, too—such as skyscrapers or wind turbines—to help reduce collisions. Thus, while the emphasis has been directed to a system and method for use by golf courses and residential home owners who wish to rid themselves of geese in their vicinity, the present invention has numerous other applications in other settings, which one of ordinary skill in the art will appreciate based on the guidance as provided herein.

While any type of light can be employed in various versions of the present invention, including yellow, amber, red, green blue and purple, preferably, the embodiments of the present system and method do not employ light in the green spectrum of 500 nm to 570 nm (on frequency to a band about 540 THz.) It is preferable to employ a light spectrum that is below that of the human but still within the light spectrum of the goose so that undesired light annoyance of humans is avoided. In preferred embodiments, lights 10 can be highly collimated or directed at very low angles across the surface of a pond and to its adjacent banks, so as not to disturb any nearby human presence such as a residence or place of business.

Preferably, a cycle of distinct, unique light flash patterns, most preferably random in nature, is employed to further agitate the geese. Amber color of the light source does not fall into the range of effecting dark-adapted nighttime vision and does not affect the rods in the eye for dark-adapted nighttime vision. At twilight, rods in the eye provide most of the vision and green is brilliantly brighter at dusk and dark than during daylight. Red, and amber on the light spectrum chart, have little effect on the rods of the eyes of either humans or geese. Ultraviolet light below human perception, preferably via LEDs, are effective at bird dispersal, as they turn off quickly and completely. Traditional incandescent lamps have residual light as they are powering down. The use of blue light is not harmful to humans as blue light phototherapy using a narrowband LED light source appears to be a safe and effective additional therapy for mild to moderate acne, with such light having a peak wavelength 409-419 nm at 40 mW/cm2. Preferred lights 10 for use in the present invention are powered by batteries which are charged by a solar panel 16 and are activated at night by a photocell. Circuitry is provided to control flashing of the light at a predetermined frequency, and encapsulation or other means are used to render the electronics waterproof.

The present invention in various embodiments is distinguished from the prior art in various ways. For example, Wells teaches the use of a device that requires the battery be above a flotation device. Wells further requires that a solar panel be positioned above a light source. Moreover, a tube must be employed to hold the battery and another tube employed to hold a ballast, resulting in an unattractive floating light post. Wells also teaches the use of a single spectrum in the amber-yellow zone. Others later described systems that employed a light spectrum that is shared with humans, namely the green spectrum of 500 nm to 570 nm on frequency to a band about 540 THz, the green region of the visual spectrum, as well as the UVA spectrum of 300 nm to 399 nm. Others have advocated the use of a spectrum in the 500 nm to 570 nm frequency to a band about 540 THz.

If geese fly into a pond and settle there, the nightly random flashes of the present system 10 drive them away, even after a single night or part thereof and they do not return. Alternative embodiments are designed for use outside a water body but still in an area where geese are sought to be repelled. In still other embodiments, the devices are designed to have a floating randomly flashing light 10 structure and resemble a Swan,—or on land, a coyote, fox, snake, and Owl etc. (natural predators and enemies of Geese) such that instead of an unattractive light fixture on a person's pond or property, the present invention provides a desirable and unobtrusive natural looking artificial decoy—that also does the job of the light alone—is more appealing to a pond owner—and neighbors—golf courses, etc. Decoys of the present invention look far more natural than an industrial appearing light post of prior art designs. Thus, in several embodiments the system is fitted inside a decoy predator animal, such as a coyote or owls decoy with flashing eyes 10, etc. for land based flashing light positions—with all such decoys having solar powered units 16, suitable flashing lights 10—either on the eyes or elsewhere. The back portion of such decoys can accommodate larger and better solar panels 16 than the small solar area described by Wells. Moreover, the light source 10 is preferably positioned above the battery and the solar panel 16 in preferred embodiments, which is in contrast to the systems described by Wells. Wells teaches the use of a device that requires the battery be above a flotation device. Wells further requires that a solar panel be positioned above a light source. Moreover, a tube must be employed to hold the battery and another tube employed to hold a ballast, resulting in an unattractive floating light post. In contrast, the present invention departs from prior art systems as described herein and as presented in the claims.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention. Those skilled in the art will appreciate that the conception upon which this disclosure is based, may readily be utilized as a basis for designing of other structures, methods and systems for carrying out the several purposes of the present invention. It is important, therefore, that the claims be regarded as including any such equivalent construction insofar as they do not depart from the spirit and scope of the present invention.

What is claimed is:

1. A method to repel geese from an area in a manner that avoids undesired light annoyances to humans, comprising:
    a) providing a device that has a light emitter that emits a predetermined wavelength of light that is detectable by geese but that is not detectable by humans,
        wherein the light wavelength is within a range of from 320-409 nm;
    b) activating the light of the device before dusk to deter geese from occupying the area prior to nightfall, wherein the light emitted by the device is directed on a plane at the eye level of a goose, wherein the device does not employ a single rhythmic cyclical flashing light pattern; and wherein the device is housed in a structure that is one of a decoy selected from the group consisting of a coyote, owl, goose, wolf, dog, snake; swan, waterfowl bird, and an alligator;
    c) randomly emitting unsynchronized light emissions using the device, with the light emissions being emitted within a time period varying from one second to 120 second intervals; and
    d) positioning at least one mirror supporting structure comprising a mirror within 50 feet of the device such that the mirror reflects the light emitted from the device in a direction parallel to the ground, wherein the at least one mirror supporting structure is adjusted to reflect light emissions off of the mirror that is received from said light emitter such that geese that may attempt to turn away from the light emitter are still exposed to flashing lights via reflections in the mirror, further confusing geese and making them anxious enough to depart the area.

2. The method as set forth in claim 1, wherein the device further comprises a sound emitter that emits a sound wavelength between 20 kHz and 22 kHz.

3. The method as set forth in claim 1, wherein the device further comprises a sound emitter that produces a subharmonic at F/2 in the range of 7.5 kHz to 10 kHz.

4. The method as set forth in claim 1, wherein the light emitter employs LED lighting elements.

5. The method as set forth in claim 1, wherein said light emitter produces a light having a sole wavelength of 409 kHz.

6. The method as set forth in claim 1, wherein a sequence of light emissions vary so that geese do not grow accustomed to a steady rhythmic emission of light or sound from said device.

7. The method as set forth in claim 1, wherein the light wavelength for the light emitter is between 400 nm and 409 nm.

8. The method as set forth in claim 1, wherein the device includes a battery, the light emitter is positioned above the battery and the device comprises a floating structure.

9. The method as set forth in claim 1, wherein the device further comprises at least one solar panel mounted below a topmost portion of the device, said at least one solar panel being mounted in an area below the light emitter.

10. The method as set forth in claim 1, wherein the light emitter is positioned within about 15"-24" from ground level and the at least one mirror supporting structure is positioned within 15"-24" from ground level.

11. The method as set forth in claim 1, wherein the decoy is a coyote.

12. The method as set forth in claim 1, wherein the light emitter varies a frequency of the unsynchronized light emissions in the range of 1 Hz to 7 Hz.

13. The method as set forth in claim 1, wherein operation of said device prevents geese from becoming accustomed to a predictable series of light flashes.

14. The method as set forth in claim 1, further comprising pre-programming desired lighting patterns, intensities, and durations of the light emitter.

15. The method as set forth in claim 1, wherein the light emitter emits a light at night that cannot be seen by humans.

16. The method as set forth in claim 1, wherein the light emitter comprises a laser.

17. A method to repel geese from an area in a manner that avoids undesired light annoyances to humans, comprising:
    a) providing a device that has a light emitter that emits a predetermined wavelength of light that is detectable by geese but that is not detectable by humans,
        wherein the light wavelength is within a range between 400 nm and 409 nm;
    b) activating the light of the device before dusk to deter geese from occupying the area prior to nightfall, wherein the light emitted by the device is directed on a plane at the eye level of a goose, wherein the device does not employ a single rhythmic cyclical flashing light pattern; and wherein the device is housed in a structure selected from the group consisting of a golf pin, and a decoy resembling one of a coyote, owl, goose, wolf, dog, snake; swan, waterfowl bird, and an alligator;
    c) randomly emitting unsynchronized light emissions using the device, with the light emissions being emitted within a time period varying from one second to 120 second intervals; and
    d) positioning at least one mirror supporting structure comprising a mirror within 50 feet of the device such that the mirror reflects the light emitted from the device in a direction parallel to the ground, wherein the at least one mirror supporting structure is adjusted to reflect light emissions off of the mirror that is received from said light emitter such that geese that may attempt to turn away from the light emitter are still exposed to flashing lights via reflections in the mirror, further confusing geese and making them anxious enough to depart the area.

18. The method as set forth in claim 17, wherein the light emitter emits a light at night that cannot be seen by humans.

19. A method to repel geese from an area in a manner that avoids undesired light annoyances to humans, comprising:
    a) providing a device that has a light emitter that emits a predetermined wavelength of light that is detectable by geese but that is not detectable by humans,
        wherein the light wavelength is within a range between 400 nm and 409 nm;

b) activating the light of the device to deter geese from occupying the area prior to nightfall, wherein the light emitted by the device is directed on a plane at the eye level of a goose, wherein the device does not employ a single rhythmic cyclical flashing light pattern; and wherein the device is housed in a structure selected from the group consisting of a golf pin, and a decoy resembling one of a coyote, owl, goose, wolf, dog, snake; swan, waterfowl bird, and an alligator;

c) randomly emitting unsynchronized light emissions using the device, with the light emissions being emitted within a time period varying from one second to 120 second intervals; and d) positioning at least one mirror supporting structure comprising a mirror within 50 feet of the device such that the mirror reflects the light emitted from the device in a direction parallel to the ground and that reflects the light emissions off of the mirror that are received from said light emitter such that geese that may attempt to turn away from the light emitter are still exposed to flashing lights via reflections in the mirror, further confusing geese and making them anxious enough to depart the area.

20. The method as set forth in claim 19, wherein the device is housed in a structure comprising a golf pin.

* * * * *